(12) United States Patent
Morris (10) Patent No.: US 7,377,069 B2
(45) Date of Patent: May 27, 2008

(54) FISHING ROD HOLDER (76) Inventor: LeRoy Morris, 11407 32nd. Ave. North, Texas City, TX (US) 77591

( * ) Notice: Subject to any disclaimer, the term of this patent is extended or adjusted under 35 U.S.C. 154(b) by 0 days.

(21) Appl. No.: 11/530,733

(22) Filed: Sep. 11, 2006

(65) Prior Publication Data
US 2008/0060251 A1 Mar. 13, 2008

(51) Int. Cl.
A01K 97/10 (2006.01)
A01K 97/12 (2006.01)

(52) U.S. Cl. .......................... 43/15; 43/21.2
(58) Field of Classification Search .............. 43/21.2, 43/15
See application file for complete search history.

(56) References Cited

U.S. PATENT DOCUMENTS

| 2,898,697 | A | * | 8/1959 | Housman | 43/15 |
|---|---|---|---|---|---|
| 2,964,868 | A | * | 12/1960 | Bennett | 43/15 |
| 4,270,298 | A | * | 6/1981 | Hodshire | 43/15 |
| 4,397,113 | A | * | 8/1983 | Pinson | 43/15 |
| 4,471,553 | A | * | 9/1984 | Copeland | 43/15 |
| 4,486,968 | A | * | 12/1984 | Gould | 43/15 |
| 5,279,064 | A | * | 1/1994 | Jaeger | 43/21.2 |
| 5,363,582 | A | * | 11/1994 | Walker et al. | 43/15 |
| 5,383,298 | A | * | 1/1995 | Engel | 43/15 |
| 5,524,376 | A | * | 6/1996 | Flisak | 43/15 |
| 5,542,205 | A | * | 8/1996 | Updike | 43/15 |
| 5,873,191 | A | * | 2/1999 | Bova et al. | 43/15 |
| 5,903,998 | A | * | 5/1999 | Hawkins et al. | 43/15 |
| 6,050,019 | A | * | 4/2000 | Anderson | 43/15 |
| 6,094,851 | A | * | 8/2000 | Guidry | 43/15 |
| 6,125,570 | A | * | 10/2000 | Valrey, Sr. | 43/15 |
| 6,684,555 | B1 | * | 2/2004 | Vela | 43/15 |

* cited by examiner

*Primary Examiner*—Kurt Rowan
(74) *Attorney, Agent, or Firm*—Mark L. Cooper; Cooper & Assoc.

(57) ABSTRACT

Disclosed herein is a fishing rod holder, comprising a rod holder pivotably attached to a base member; the rod holder comprising a main pivot arm, a trigger pivot arm and a resilient member attachment point, a trigger pivotably attached to the rod holder at the trigger pivot arm; the base member comprises a main pivot support having at least one trigger groove disposed therein, which is attached to the base member, a trigger resilient member attached to a main pivot end of the main pivot support, wherein the trigger is dimensioned to releasingly engage the trigger groove, and wherein the trigger resilient member is dimensioned and arranged to engage the trigger, and a main resilient member attached between the base and the resilient member attachment point. The fishing rod holder has a cocked configuration and a released configuration. A method of using the fishing rod holder is also disclosed.

20 Claims, 6 Drawing Sheets

FISHING ROD HOLDER

BACKGROUND OF THE INVENTION

The present invention generally relates to apparatus and method for a fishing rod holder. More specifically, the present invention relates to apparatus and methods relating to a fishing rod holder with a cocked configuration and a released configuration operable by an external force applied to the fishing rod.

Fishing rod holders include those which merely hold the fishing rod, and those which are set, and upon the fish engaging the line of the fishing rod, respond by setting the hook, providing a signal that activity has occurred, or both. Fishing rod holders which provide a response consistent with setting the hook are fit into two major categories. Fishing rod holders may be triggered by a force applied to the fishing rod, or may be responsive to the movement of the fishing line itself. Fishing rod holders which require a physical attachment between the trigger mechanism and the fishing line may be complicated in design, and present the opportunity of abnormal wear and possible entanglement of the fishing line.

Fishing rod holders which are responsive to a force applied to the fishing rod may be unreliable in triggering, or may lack the necessary amount of force to adequately set a hook while fishing. Accordingly, a need exists for a fishing rod holder with a reliable trigger mechanism that does not require contact with the fishing line, which provides adequate force to set a hook upon activation.

SUMMARY OF THE INVENTION

In one aspect of the present invention, a fishing rod holder comprises: a rod holder pivotably attached to a base member; the rod holder comprising a plurality of sides disposed about a holder central axis defining a rod holder cavity dimensioned to receive at least a portion of a fishing rod handle; a top end separated from a bottom end along the holder central axis; a main pivot arm disposed between the top end and the bottom end and attached to at least one of the plurality of sides of the rod holder and extending laterally outward from at least one of the plurality of sides in a direction away from the holder central axis; a trigger pivot arm disposed between the main pivot arm and the bottom end, attached to at least one of the plurality of sides and extending laterally outward from at least one of the plurality of sides in a direction away from the holder central axis; a resilient member attachment point disposed between the trigger pivot arm and the bottom end, attached to at least one of the plurality of sides and extending laterally outward from at least one of the plurality of sides in a direction away from the holder central axis; a trigger having a trigger end and a trigger pivot end; the trigger pivot end pivotably attached to the rod holder at the trigger pivot arm; the base member comprising a main pivot support having at least one trigger groove disposed between a mounting end and a main pivot end; the mounting end attached to the base member at a main pivot attachment point disposed between a first base member end and a second base member end; a trigger resilient member attached to the main pivot end and extending away from the main pivot end towards the mounting end; at least one resilient member anchor disposed on the base member between the first base member end and the main pivot attachment point; wherein the main pivot end is pivotably attached to the main pivot arm of the rod holder, wherein the trigger end is dimensioned to releasingly engage the trigger groove, and wherein the trigger resilient member is dimensioned and arranged to engage the trigger between the trigger end and the trigger pivot end when the trigger end is engaged with the trigger groove; and a main resilient member attached between the at least one resilient member anchor and the resilient member attachment point.

In yet another aspect of the present invention a fishing rod holder comprises: a rod holder, pivotably attached to a base member; the rod holder comprising a plurality of sides disposed about a holder central axis defining a rod holder cavity dimensioned to receive at least a portion of a fishing rod handle; a top end separated from a bottom end along the holder central axis; a main pivot arm disposed between the top end and the bottom end and attached to at least one of the plurality of sides of the rod holder and extending laterally outward from at least one of the plurality of sides in a direction away from the holder central axis; a trigger pivot arm disposed between the main pivot arm and the bottom end, attached to at least one of the plurality of sides and extending laterally outward from at least one of the plurality of sides in a direction away from the holder central axis; a resilient member attachment point disposed between the trigger pivot arm and the bottom end, attached to at least one of the plurality of sides and extending laterally outward from at least one of the plurality of sides in a direction away from the holder central axis; a trigger having a trigger end and a trigger pivot end; the trigger pivot end pivotably attached to the rod holder at the trigger pivot arm; a signaling device attached to the rod holder to produce an audible and/or a visual signal upon the conversion of the fishing rod holder from a cocked configuration to a released configuration; a locking collar that is rotationally attached to the top end of the rod holder, capable of rotating about the holder central axis, the locking collar comprising a locking means capable of engaging at least a portion of the fishing rod handle to engage the fishing rod handle with the locking collar; the base member comprising a main pivot support having at least one trigger groove disposed between a mounting end and a main pivot end; the mounting end attached to the base member at a main pivot attachment point disposed between a first base member end and a second base member end; a trigger resilient member attached to the main pivot end and extending away from the main pivot end towards the mounting end; at least one resilient member anchor attached to the base member between the first base member end and the main pivot attachment point; wherein the main pivot end is pivotably attached to the main pivot arm of the rod holder, wherein the trigger end is dimensioned to releasingly engage the trigger groove, and wherein the trigger resilient member is dimensioned and arranged to engage the trigger between the trigger end and the trigger pivot end when the trigger end is engaged with the trigger groove, wherein the trigger groove comprises a semi-spherical indentation disposed into the main pivot support; a trigger spring holder attached to the trigger, dimensioned and arranged to engage the trigger resilient member when the trigger end is engaged with the trigger groove; wherein the base member comprises one or more mounting feet, each attached at or near the first base member end the second base member end, or a combination thereof, and wherein at least one of the mounting feet comprises at least one mounting opening there through such that the fishing rod holder is attachable to an external surface by means of a fastener protruding through the at least one mounting opening and attached to the external surface, or to the earth by means of a spike protruding through the at least one mounting opening and into the earth; and a main resilient member attached between the at least one resilient member anchor and the resilient member attachment point, wherein the resilient member attachment point comprises a T-bar and wherein the main resilient member comprises a plurality of springs each attached between the T-bar, and the at least one resilient member anchor.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
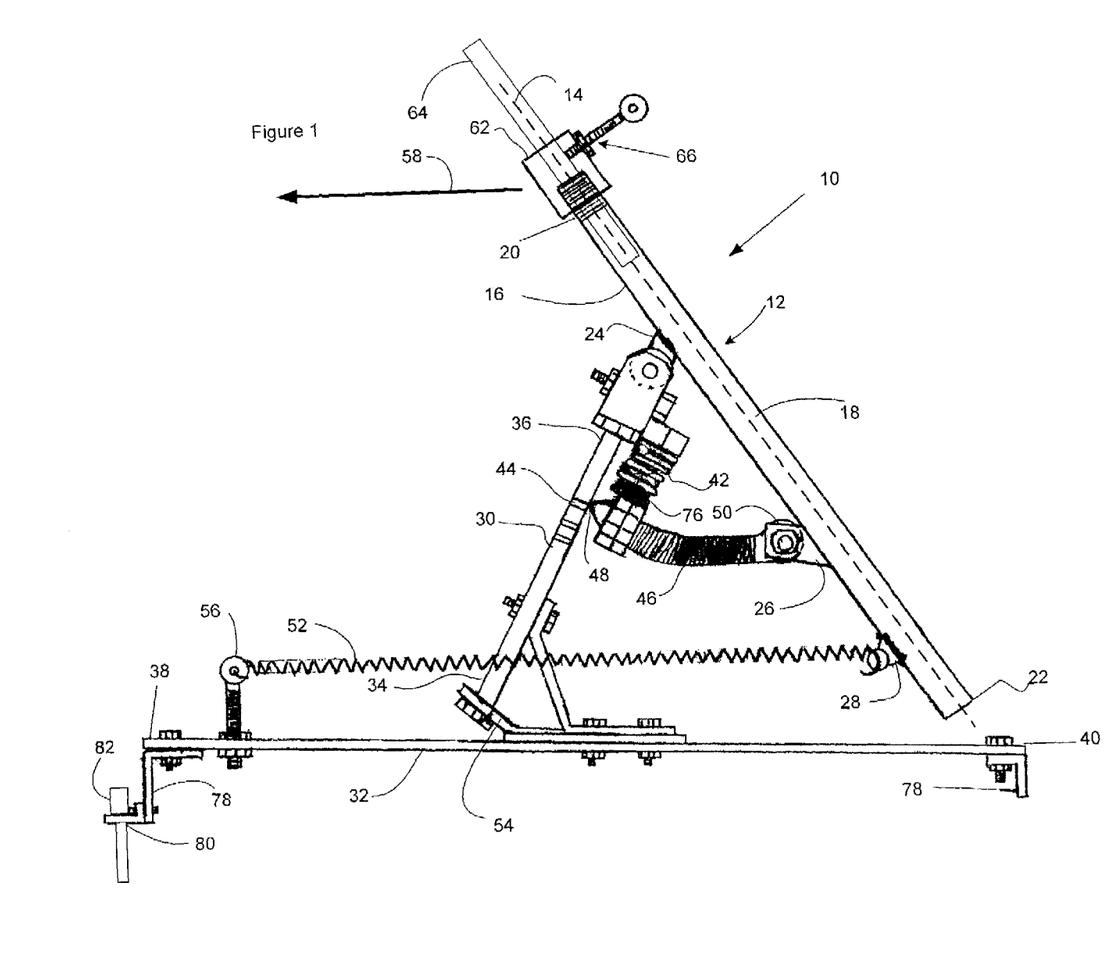
FIG. 1 is a side view of an embodiment of the instant fishing rod holder.

In more specifically describing the present invention, FIG. 1 shows a side view of an embodiment of the instant fishing rod holder. The instant fishing rod holder labeled generally as 10 comprises a rod holder (12), pivotably attached to a base member (32). The rod holder (12) comprising a plurality of sides (16) disposed about a holder central axis (14) defining a rod holder cavity (18) dimensioned to receive at least a portion of a fishing rod handle (64). The fishing rod holder (12) has a top end (20) separated from a bottom end (22) along the holder central axis (14). A main pivot arm (24) is disposed between the top end (20) and the bottom end (22) of the fishing rod holder, and is attached to at least one of the plurality of sides (16) of the rod holder (12) and extending laterally outward from at least one of the plurality of sides (16) in a direction away from the holder central axis (14).

The rod holder (12) also has a trigger pivot arm (26) disposed between the main pivot arm (24) and the bottom end (22), attached to at least one of the plurality of sides (16) and extending laterally outward from at least one of the plurality of sides (16) in a direction away from the holder central axis (14). The rod holder (12) preferably has a resilient member attachment point (28) disposed between the trigger pivot arm (26) and the bottom end (22), attached to at least one of the plurality of sides (16) and extending laterally outward from at least one of the plurality of sides (16) in a direction away from the holder central axis (14). A trigger (46) having a trigger end (48) and a trigger pivot end (50), which is preferably pivotably attached to the rod holder (12) at the trigger pivot arm (26).

The base member (32) comprises a main pivot support (30) having at least one trigger groove (44) disposed between a mounting end (34) and a main pivot end (36). The mounting end (34) is attached to the base member (32) at a main pivot attachment point (54) disposed between a first base member end (38) and a second base member end (40). A trigger resilient member (42) is attached to the main pivot end (36) and extends away from the main pivot end (36) towards the mounting end (34). At least one resilient member anchor (56) may be disposed on the base member (32) between the first base member end (38) and the main pivot attachment point (54).

In an embodiment, the main pivot end (36) is pivotably attached to the main pivot arm (24) of the rod holder (12), the trigger end (48) is dimensioned to releasingly engage the trigger groove (44), and the trigger resilient member (42) is dimensioned and arranged to engage the trigger (46) between the trigger end (48) and the trigger pivot end (50) when the trigger end (48) is engaged with the trigger groove (44). The rod holder (10) also comprises a main resilient member (52) attached between the at least one resilient member anchor (56) and the resilient member attachment point (28).

Figure 2:
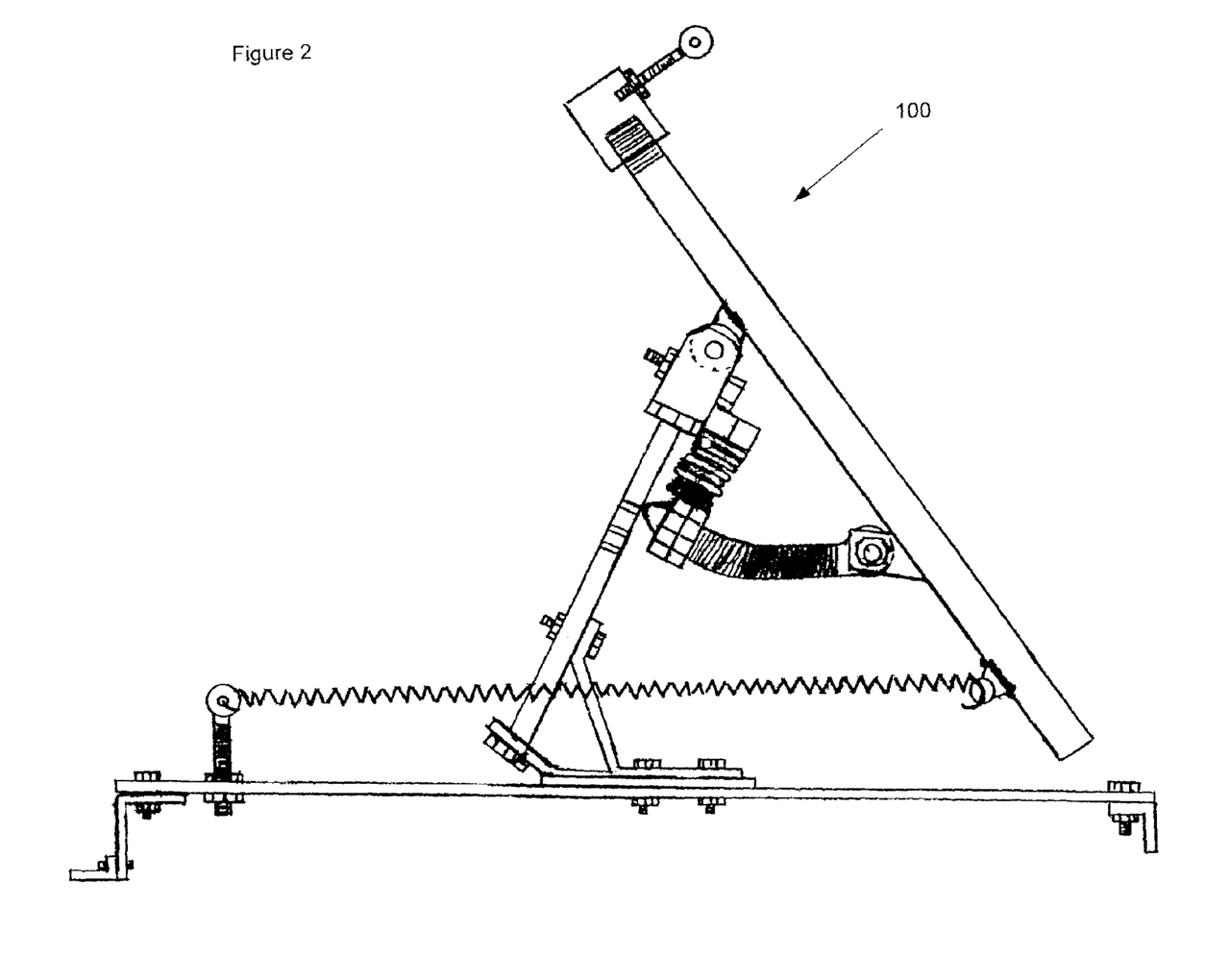
FIG. 2 is a side view of an embodiment of the instant fishing rod holder in a cocked configuration.

As shown in FIG. 2, the instant fishing rod holder (10) may have a cocked configuration (100), wherein the trigger end (48) is engaged with the trigger groove (44) and the trigger resilient member (42) is engaged with the trigger (46) such that the trigger end (48) is biased in a direction opposite the main pivot end (36) by the trigger resilient member (42). In this cocked configuration (100) the bottom end (22) of the rod holder (12) is biased in a direction towards the first base member end (38) by the main resilient member (52).

Figure 3:
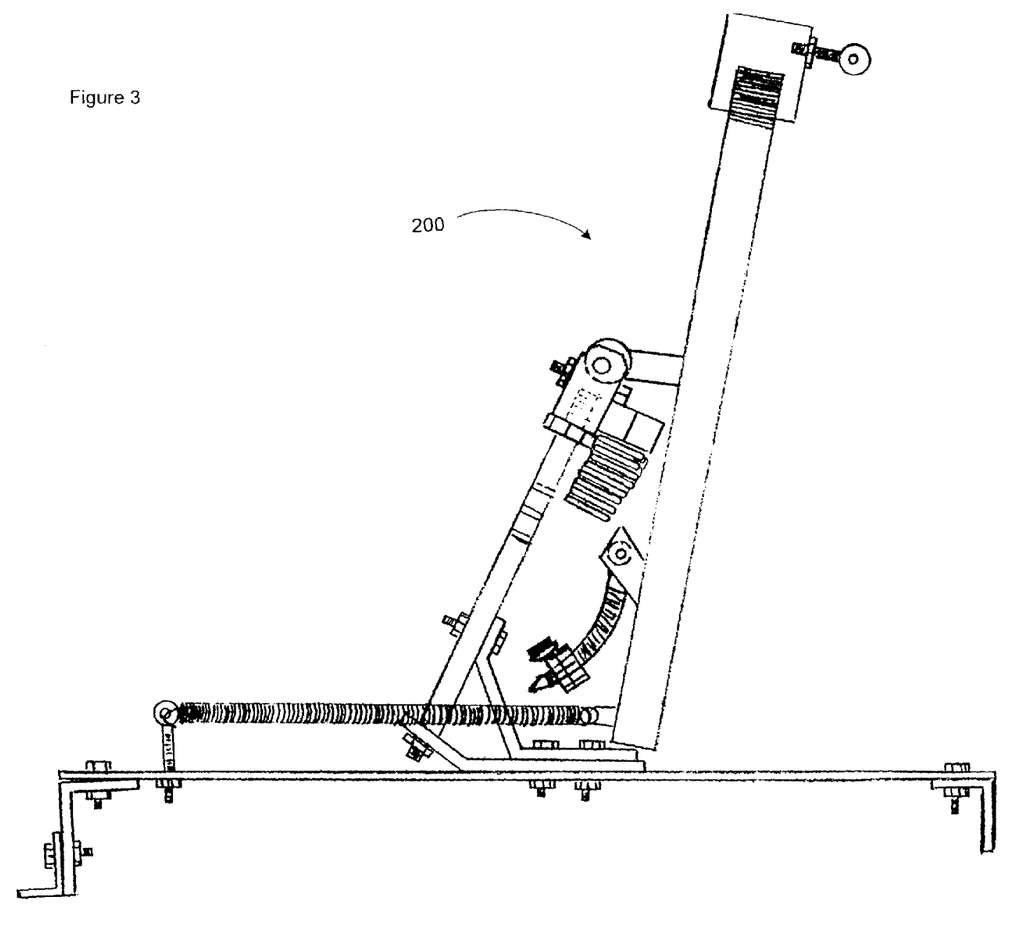
FIG. 3 is a side view of an embodiment of the instant fishing rod holder in a released configuration.

As shown in FIG. 3. the instant fishing rod holder may have a released configuration (200) which results from a lateral force (58) applied to the top end (20) of the rod holder (12) of the fishing rod holder (10) in the cocked configuration (100). This lateral force may be supplied by a fish "biting" the hook of an extended fishing line attached to the fishing pole. The lateral force (58) results in the trigger end (48) being disengaged from the trigger grove (44), causing the trigger resilient member (42) to expand, thus causing the trigger (46) to pivot about the trigger pivot arm (26), and causing the rod holder (12) to pivot about the main pivot end (36) such that the bottom end (22) is moved in a direction toward the first base member end (38) by the main resilient member (52). This action thus "sets the hook" with a force proportional to the force being applied to the rod holder (12) by the main resilient member (52).

In an embodiment, the instant fishing rod holder may further comprise a signaling device (60), preferably attached to the rod holder (12) to produce an audible and/or a visual signal upon the conversion of the fishing rod holder (10) from the cocked configuration (100) to the released configuration (200).

In an embodiment, the signaling device (60) comprises a bell (e.g., a signaling bell or the like.) In another embodiment, the signaling device (60) may comprise an electrical device capable of producing a luminous signal, an audible signal, or both. Any configuration comprising switches, proximity indicators, motion detectors, or the like as known to those of skill in the art are suitable for use herein. Preferably, at least a portion of the signaling device (60) is attached to the trigger pivot arm (26).

In an embodiment, the instant fishing rod holder further comprises a locking collar (62) (FIG. 1) that is rotationally attached to the top end (20) of the rod holder (12). Preferably, the locking collar (62) is capable of rotating about the holder central axis (14). The locking collar (62) preferably comprises a locking means (66) capable of engaging at least a portion of the fishing rod handle (64) with the locking collar (62). The locking means (66) may comprise at least one threaded member, such as a set screw, which is threaded through the locking collar (62) and capable of frictionally engaging a rod end (64) inserted within the rod holder cavity (18).

Figures 5A, 5B:
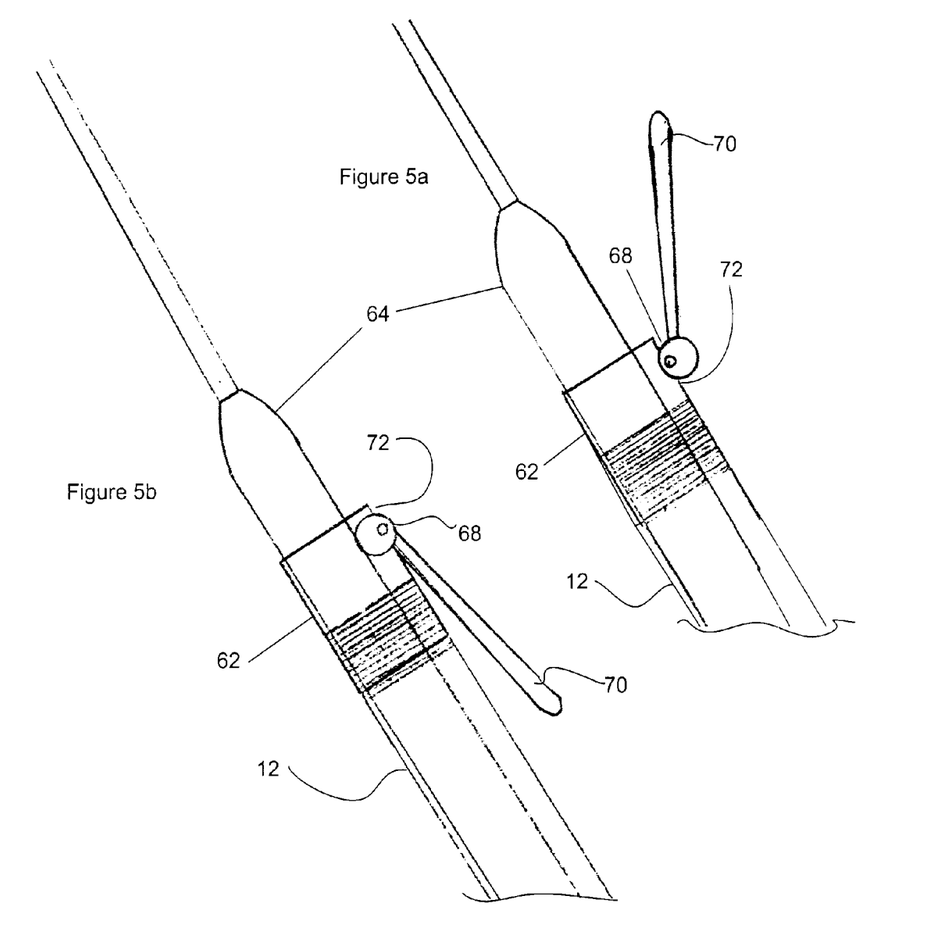
FIGS. 5a and 5b are side views of a portion of an embodiment of the instant fishing rod holder.
Figure 6:
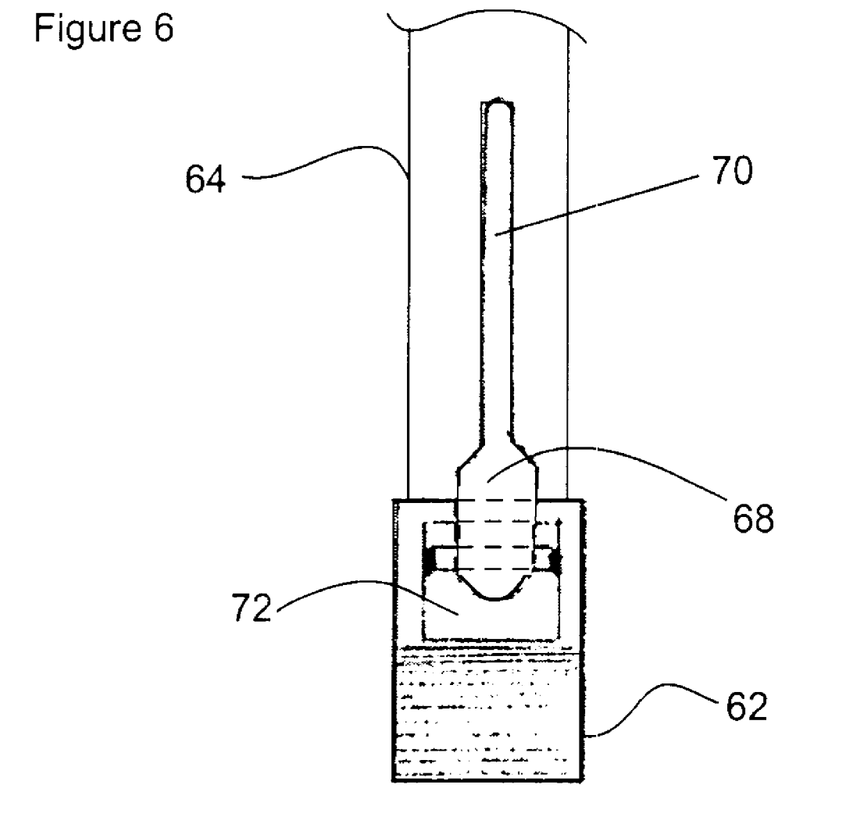
FIG. 6 is a top view of the portion of FIGS. 5a and 5b.

As shown in FIGS. 5a, 5b, and 6, in another embodiment, the locking means (66) may comprise an eccentric cam (68) attached to a cam handle (70). Preferably, the eccentric cam (68) may be rotationally attached to the locking collar (62) such that at least a portion of the eccentric cam (68) protrudes through a cam hole (72) disposed through the locking collar (62) upon rotation of the of the eccentric cam (68) (e.g., through movement of the cam handle (70) relative to the locking collar (62).

In an embodiment, the top end (20) of the rod holder (12) may be threaded (84), and the locking collar (62) may be threaded (86) to receive the threaded top end (20), thus allowing for rotational movement of the locking collar (62) about the holder central axis (14).

In an embodiment the at least one trigger groove (44) comprises a semi-spherical indentation disposed into the main pivot support (30). In another embodiment, the at least one trigger groove (44) may comprise an indentation circumferentially disposed into the main pivot support (30).

The main resilient member (52), the trigger resilient member (42), or both may comprise a metal spring, an elastomeric chord or spacer, or a combination thereof. Suitable examples of elastomeric chords include so called "bungee chords" comprising rubber and/or other elastomers. Suitable elastomeric spacers (for use as the trigger resilient member (42)) may include elastomeric (e.g., rubber) blocks, foam rubber blocks, and the like. The resiliency of the main resilient member and/or the trigger resilient member preferably possess the required resiliency to "set the hook", and to assist in the release of the trigger mechanism upon application of the above lateral force to convert the instant fishing rod holder from the cocked configuration (100) to the released configuration (200.) However, the actual values depend on the fishing rod utilized, the anticipated size of the fish, the tackle being used, and other considerations which make exact quantification of these forces impossible to calculate, absent specific examples.

In an embodiment, the instant fishing rod holder (10) further comprises a base member 32 comprising one or more mounting feet (78), each attached at or near the first base member end (38) the second base member end (40), or a combination thereof. Preferably, at least one of the mounting feet (78) comprises a mounting opening (80) disposed there-through, such that the fishing rod holder (10) is attachable to an external surface (e.g., a boat, a fishing pier, a dock, or the like) by means of a fastener protruding through the at least one mounting opening (80) and attached to the external surface. In another embodiment, the instant fishing rod holder (10) is attachable to the earth by means of a spike (82) protruding through the at least one mounting opening (80) and into the earth.

Figure 4:
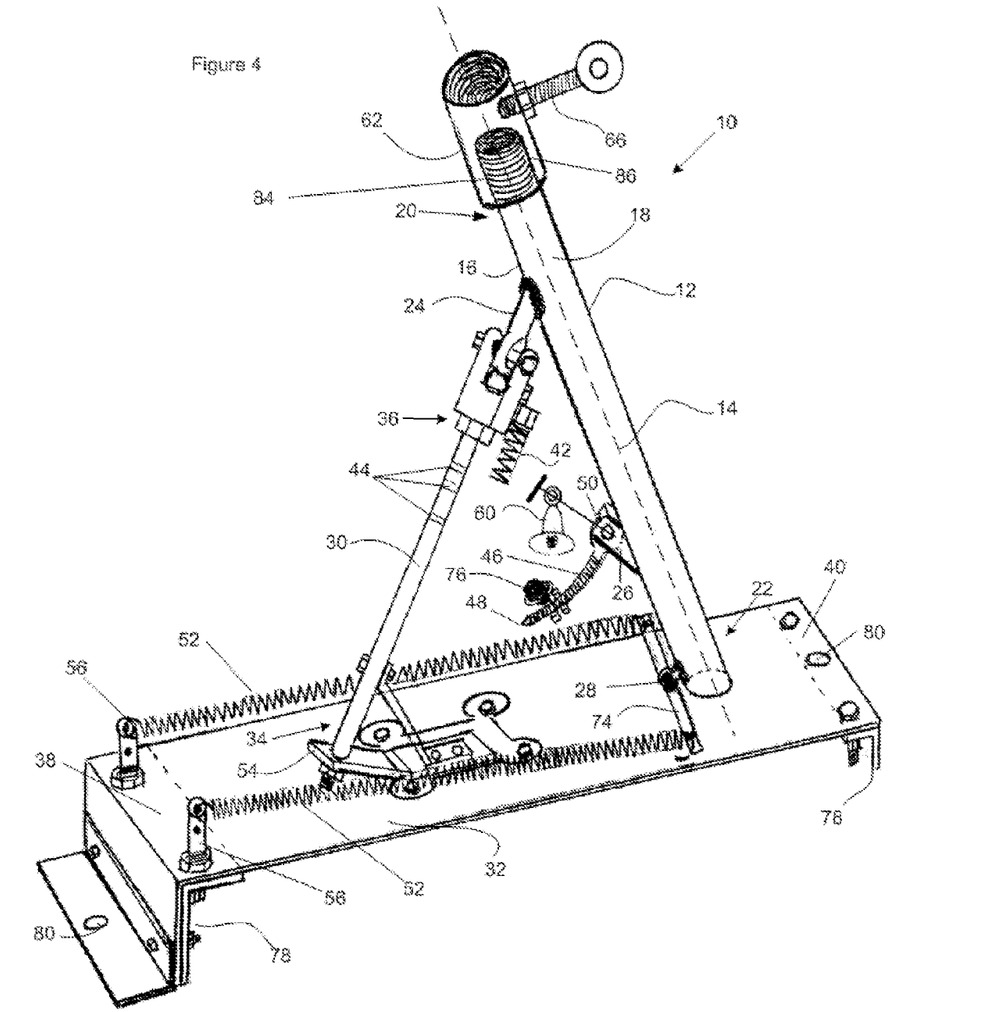
FIG. 4 is a perspective view of an embodiment of the instant fishing rod holder.

As shown in FIG. 4, in an embodiment of the instant fishing rod holder (10), the resilient member attachment point (28) may comprise a T-bar (74). In addition, the main resilient member (52) may comprise a plurality of resilient members (52), each attached between the T-bar (74), and the resilient member anchors (56).

In another embodiment, the trigger resilient member (42) may be a metal spring, and the trigger (46) may comprise a trigger spring holder (76) dimensioned and arranged to engage the trigger resilient member (42) when the trigger end (48) is engaged with the trigger groove (44) (see FIG. 1).

Preferably, the resilient member attachment point (28), the trigger pivot arm (26), and the main pivot arm (24) are collinear with each other, and parallel to the holder central axis (14).

It should be understood, of course, that the foregoing relates to preferred embodiments of the invention and that modifications may be made without departing from the spirit and scope of the invention as set forth in the following claims.

I claim:

1. A fishing rod holder comprising: a rod holder, pivotably attached to a base member; the rod holder comprising a plurality of sides disposed about a holder central axis defining a rod holder cavity dimensioned to receive at least a portion of a fishing rod handle;

a top end separated from a bottom end along the holder central axis;

a main pivot arm disposed between the top end and the bottom end and attached to at least one of the plurality of sides of the rod holder and extending laterally outward from at least one of the plurality of sides in a direction away from the holder central axis;

a trigger pivot arm disposed between the main pivot arm and the bottom end, attached to at least one of the plurality of sides and extending laterally outward from at least one of the plurality of sides in a direction away from the holder central axis;

a resilient member attachment point disposed between the trigger pivot arm and the bottom end, attached to at least one of the plurality of sides and extending laterally outward from at least one of the plurality of sides in a direction away from the holder central axis; a trigger having a trigger end and a trigger pivot end;

the trigger pivot end pivotably attached to the rod holder at the trigger pivot arm;

the base member comprising a main pivot support having at least one trigger groove disposed between a mounting end and a main pivot end;

the mounting end attached to the base member at a main pivot attachment point disposed between a first base member end and a second base member end;

a trigger resilient member attached to the main pivot end and extending away from the main pivot end towards the mounting end;

at least one resilient member anchor disposed on the base member between the first base member end and the main pivot attachment point;

wherein the main pivot end is pivotably attached to the main pivot arm of the rod holder, wherein the trigger end is dimensioned to releasingly engage the trigger groove, and wherein the trigger resilient member is dimensioned and arranged to engage the trigger between the trigger end and the trigger pivot end when the trigger end is engaged with the trigger groove; and a main resilient member attached between the at least one resilient member anchor and the resilient member attachment point.

2. The fishing rod holder of claim 1, having a cocked configuration, wherein the trigger end is engaged with the trigger groove and the trigger resilient member is engaged with the trigger such that the trigger end is biased in a direction opposite the main pivot end by the trigger resilient member, and wherein the bottom end of the rod holder is biased in a direction towards the first base member end by the main resilient member.

3. The fishing rod holder of claim 2, having a released configuration which results from a lateral force applied to the top end of the rod holder of the fishing rod holder in the cocked configuration, wherein the lateral force results in the trigger end being disengaged from the trigger grove, causing the trigger resilient member to expand, causing the trigger to pivot about the trigger pivot arm, and causing the rod holder to pivot about the main pivot end such that the bottom end is moved in a direction toward the first base member end by the main resilient member, to produce the released configuration of the fishing rod holder.

4. The fishing rod holder of claim 3, further comprising a signaling device attached to the rod holder to produce an audible and/or a visual signal upon the conversion of the fishing rod holder from the cocked configuration to the released configuration.

5. The fishing rod holder of claim 4, wherein the signaling device comprises a bell.

6. The fishing rod holder of claim 4, wherein the signaling device comprises an electrical device capable of producing a luminous signal, an audible signal, or both.

7. The fishing rod holder of claim 4, wherein at least a portion of the signaling device is attached to the trigger pivot arm.

8. The fishing rod holder of claim 1, wherein the rod holder further comprises a locking collar that is rotationally attached to the top end of the rod holder, capable of rotating about the holder central axis, the locking collar comprising a locking means capable of engaging at least a portion of the fishing rod handle with the locking collar.

9. The fishing rod holder of claim 8, wherein the locking means comprises at least one threaded member, threaded through the locking collar.

10. The fishing rod holder of claim 8, wherein the locking means comprises an eccentric cam attached to a cam handle, the eccentric cam rotationally attached to the locking collar such that at least a portion of the eccentric cam protrudes through a cam hole disposed through the locking collar upon rotation of the of the eccentric cam relative to the locking collar.

11. The fishing rod holder of claim 8, wherein the top end of the rod holder is threaded, and wherein the locking collar is threaded to receive the threaded top end.

12. The fishing rod holder of claim 1, wherein the at least one trigger groove comprises a semi-spherical indentation disposed into the main pivot support.

13. The fishing rod holder of claim 1, wherein the at least one trigger groove comprises an indentation circumferentially disposed into the main pivot support.

14. The fishing rod holder of claim 1, wherein the main resilient member, the trigger resilient member, or both comprise a metal spring, an elastomeric cord, or a combination thereof.

15. The fishing rod holder of claim 1, wherein the base member 32 comprises one or more mounting feet, each attached at or near the first base member end the second base member end, or a combination thereof, and wherein at least one of the mounting feet comprises a mounting opening there through such that the fishing rod holder is attachable to an external surface by means of a fastener protruding through the at least one mounting opening and attached to the external surface, or to the earth by means of a spike protruding through the at least one mounting opening and into the earth.

16. The fishing rod holder of claim 1, wherein the resilient member attachment point comprises a T-bar and wherein the main resilient member comprises a plurality of resilient members each attached between the T-bar, and the at least one resilient member anchor.

17. The fishing rod holder of claim 1, wherein the trigger resilient member is a metal spring, and wherein the trigger comprises a trigger spring holder dimensioned and arranged to engage the trigger resilient member when the trigger end is engaged with the trigger groove.

18. The fishing rod holder of claim 1, wherein the resilient member attachment point, the trigger pivot arm, and the main pivot arm are collinear with each other, and parallel to the holder central axis.

19. A method of utilizing the fishing rod holder of claim 3, comprising the steps of setting the fishing rod holder into the cocked configuration and placing at least a portion of a fishing rod handle into the rod holder cavity.

20. A fishing rod holder comprising:
a rod holder, pivotably attached to a base member;
the rod holder comprising a plurality of sides disposed about a holder central axis defining a rod holder cavity dimensioned to receive at least a portion of a fishing rod handle;
a top end separated from a bottom end along the holder central axis;
a main pivot arm disposed between the top end and the bottom end and attached to at least one of the plurality of sides of the rod holder and extending laterally outward from at least one of the plurality of sides in a direction away from the holder central axis;
a trigger pivot arm disposed between the main pivot arm and the bottom end, attached to at least one of the plurality of sides and extending laterally outward from at least one of the plurality of sides in a direction away from the holder central axis;
a resilient member attachment point disposed between the trigger pivot arm and the bottom end, attached to at least one of the plurality of sides and extending laterally outward from at least one of the plurality of sides in a direction away from the holder central axis;
a trigger having a trigger end and a trigger pivot end;
the trigger pivot end pivotably attached to the rod holder at the trigger pivot arm;
a signaling device attached to the rod holder to produce an audible and/or a visual signal upon the conversion of the fishing rod holder from a cocked configuration to a released configuration;
a locking collar that is rotationally attached to the top end of the rod holder, capable of rotating about the holder central axis, the locking collar comprising a locking means capable of engaging at least a portion of the fishing rod handle to engage the fishing rod handle with the locking collar;
the base member comprising a main pivot support having at least one trigger groove disposed between a mounting end and a main pivot end;
the mounting end attached to the base member at a main pivot attachment point disposed between a first base member end and a second base member end;
a trigger resilient member attached to the main pivot end and extending away from the main pivot end towards the mounting end;
at least one resilient member anchor attached to the base member between the first base member end and the main pivot attachment point;
wherein the main pivot end is pivotably attached to the main pivot arm of the rod holder, wherein the trigger end is dimensioned to releasingly engage the trigger groove, and wherein the trigger resilient member is dimensioned and arranged to engage the trigger between the trigger end and the trigger pivot end when the trigger end is engaged with the trigger groove, wherein the trigger groove comprises a semi-spherical indentation disposed into the main pivot support;

a trigger spring holder attached to the trigger, dimensioned and arranged to engage the trigger resilient member when the trigger end is engaged with the trigger groove;

wherein the base member comprises one or more mounting feet, each attached at or near the first base member end the second base member end, or a combination thereof, and wherein at least one of the mounting feet comprises at least one mounting opening there through such that the fishing rod holder is attachable to an external surface by means of a fastener protruding through the at least one mounting opening and attached to the external surface, or to the earth by means of a spike protruding through the at least one mounting opening and into the earth; and a main resilient member attached between the at least one resilient member anchor and the resilient member attachment point, wherein the resilient member attachment point comprises a T-bar and wherein the main resilient member comprises a plurality of springs each attached between the T-bar, and the at least one resilient member anchor.

\* \* \* \* \*